US012623468B2

(12) United States Patent
Tao et al.

(10) Patent No.: US 12,623,468 B2
(45) Date of Patent: May 12, 2026

(54) LABEL PRINTING AND ATTACHING SYSTEM

(71) Applicants: Tyco Electronics (Dongguan) Ltd., Dongguan (CN); TE Connectivity Solutions GmbH, Schaffhausen (CH); Tyco Electronics (Shanghai) Co., Ltd., Shanghai (CN)

(72) Inventors: Zongjie (Jason) Tao, Shanghai (CN); Hongzhou (Andy) Shen, Dongguan (CN); Dandan (Emily) Zhang, Shanghai (CN); Roberto Francisco-Yi Lu, Bellevue, WA (US); Guoqiang Liu, Dongguan (CN); Ziqiang Xiong, Dongguan (CN); Kai Fu, Dongguan (CN); Xueyun Zhu, Dongguan (CN); Yi Li, Dongguan (CN); Xuyan Yu, Dongguan (CN)

(73) Assignees: Tyco Electronics (Shanghai) Co., Ltd., Shanghai (CN); Tyco Electronics (Dongguan) Ltd., Dongguan City (CN); TE Connectivity Solutions GmbH, Schaffhausen (CH)

( * ) Notice: Subject to any disclaimer, the term of this patent is extended or adjusted under 35 U.S.C. 154(b) by 272 days.

(21) Appl. No.: 18/476,448

(22) Filed: Sep. 28, 2023

(65) Prior Publication Data

US 2024/0109337 A1 Apr. 4, 2024

(30) Foreign Application Priority Data

Sep. 28, 2022 (CN) ......................... 202211192833.3

(51) Int. Cl.
*B41J 3/407* (2006.01)
*B41J 15/04* (2006.01)

(52) U.S. Cl.
CPC ............ *B41J 3/4075* (2013.01); *B41J 15/04* (2013.01)

(58) Field of Classification Search
CPC ... B41J 3/4075; B41J 15/04; B41J 3/44; B41J 2/315; B41J 33/14; B41J 2/325; B41J 2/32; B65C 9/02; B65C 9/08; B65C 9/26; B41F 16/00; B41F 16/0006; B41F 16/0026; B41F 16/0033
See application file for complete search history.

(56) References Cited

U.S. PATENT DOCUMENTS

2023/0031377 A1* 2/2023 Beck ................. G05B 19/4182

FOREIGN PATENT DOCUMENTS

CN 102941948 A * 2/2013

* cited by examiner

*Primary Examiner* — Kristal Feggins
(74) *Attorney, Agent, or Firm* — Barley Snyder

(57) ABSTRACT

A label printing and attaching system includes a label printing device and a label attaching device. The label printing device has an ink tape supply mechanism for supplying an ink tape with a label pattern. A label tape supply mechanism of the label printing device is adapted to supply a label tape that includes a carrier tape and blank label paper adhered to the carrier tape. The label printing device further includes a heat transfer machine adapted to heat transfer the label pattern on the ink tape onto the blank label paper of the label tape to obtain a desired label. The label attaching device has a label picker adapted to pick up the label with the printed label pattern from the label tape, and a moving device adapted to move the label picker to place the picked label with the printed label pattern onto a product.

20 Claims, 2 Drawing Sheets

LABEL PRINTING AND ATTACHING SYSTEM

CROSS-REFERENCE TO RELATED APPLICATION

This application claims the benefit of Chinese Patent Application No. CN202211192833.3 filed on Sep. 28, 2022, in the State Intellectual Property Office of China, the whole disclosure of which is incorporated herein by reference.

FIELD OF THE INVENTION

The present invention relates to a label printing and attaching system for printing a label and attaching the printed label onto a product.

BACKGROUND

Currently, there is no label printing and attaching system that can efficiently achieve automated labeling. In the prior art, the label is usually printed by a printer and then manually attached to the product. The efficiency of the existing labeling scheme is very low, which reduces the efficiency of the entire product production line.

SUMMARY

According to an embodiment of the present disclosure, a label printing and attaching system includes a label printing device and a label attaching device. The label printing device has an ink tape supply mechanism for supplying an ink tape with a label pattern. A label tape supply mechanism of the label printing device is adapted to supply a label tape that includes a carrier tape and blank label paper adhered to the carrier tape. The label printing device further includes a heat transfer machine adapted to heat transfer the label pattern on the ink tape onto the blank label paper of the label tape to obtain a desired label. The label attaching device includes a label picker adapted to pick up the label with the printed label pattern from the label tape, and a moving device moving the label picker to place the picked label with the printed label pattern onto a product.

BRIEF DESCRIPTION OF THE DRAWINGS

The invention will now be described by way of example with reference to the accompanying Figures, of which.

DETAILED DESCRIPTION OF THE EMBODIMENTS

Figure 1:
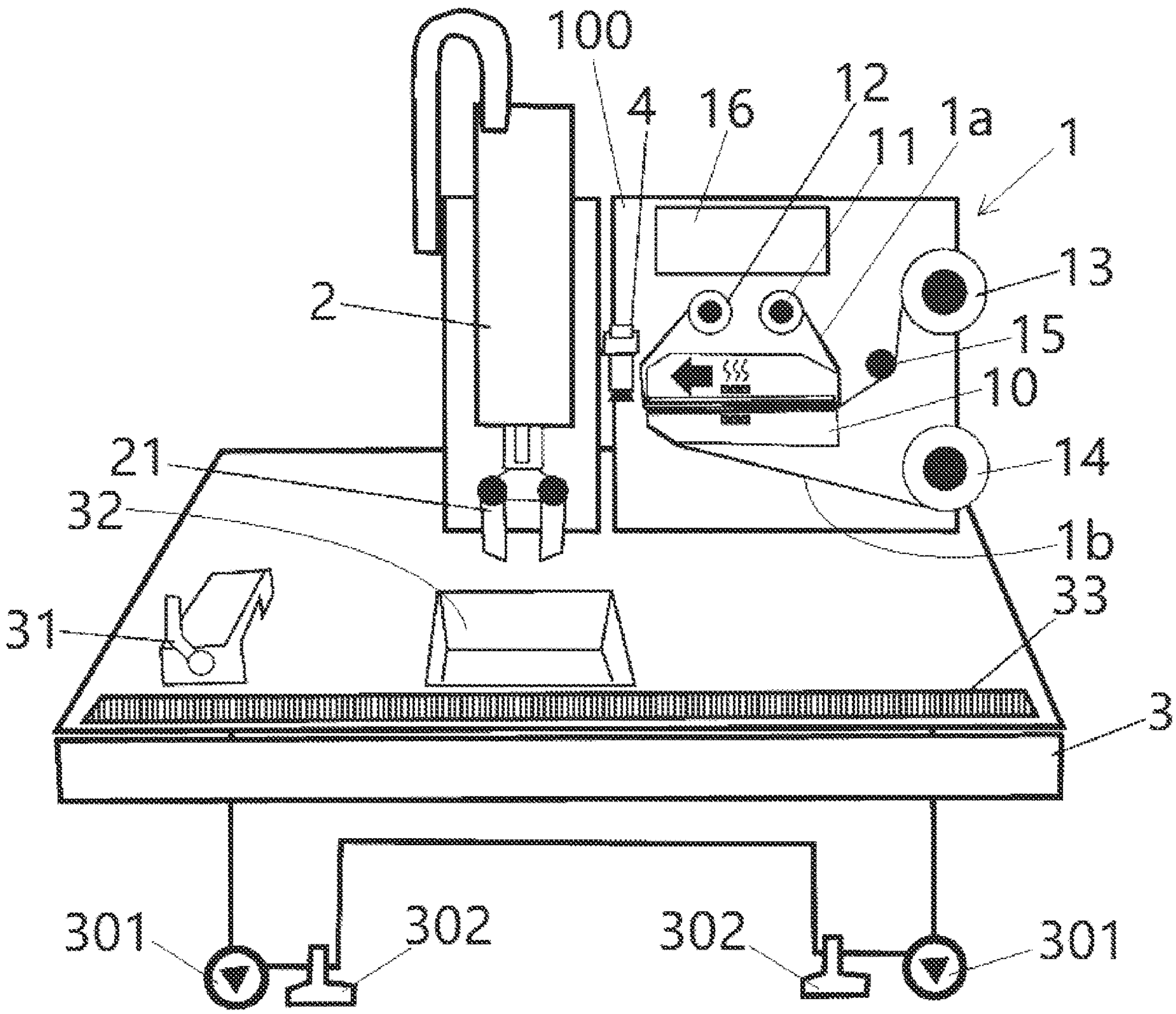
FIG. 1 is an illustrative view of a label printing and attaching system according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A label printing and attaching system according to an embodiment of the present disclosure includes a label printing device and a label attaching device. The label printing device has: 1) an ink tape supply mechanism for supplying an ink tape with a label pattern; 2) a label tape supply mechanism for supplying a label tape, wherein the label tape comprises a carrier tape and blank label paper adhered to the carrier tape; and 3) a heat transfer machine which is used to heat transfer the label pattern on the ink tape onto the blank label paper of the label tape to obtain a desired label. The label attaching device includes a label picker suitable for picking up the label with the printed label pattern from the label tape, and a moving device for moving the label picker to stick the picked label with the printed label pattern onto a product.

Figure 2:
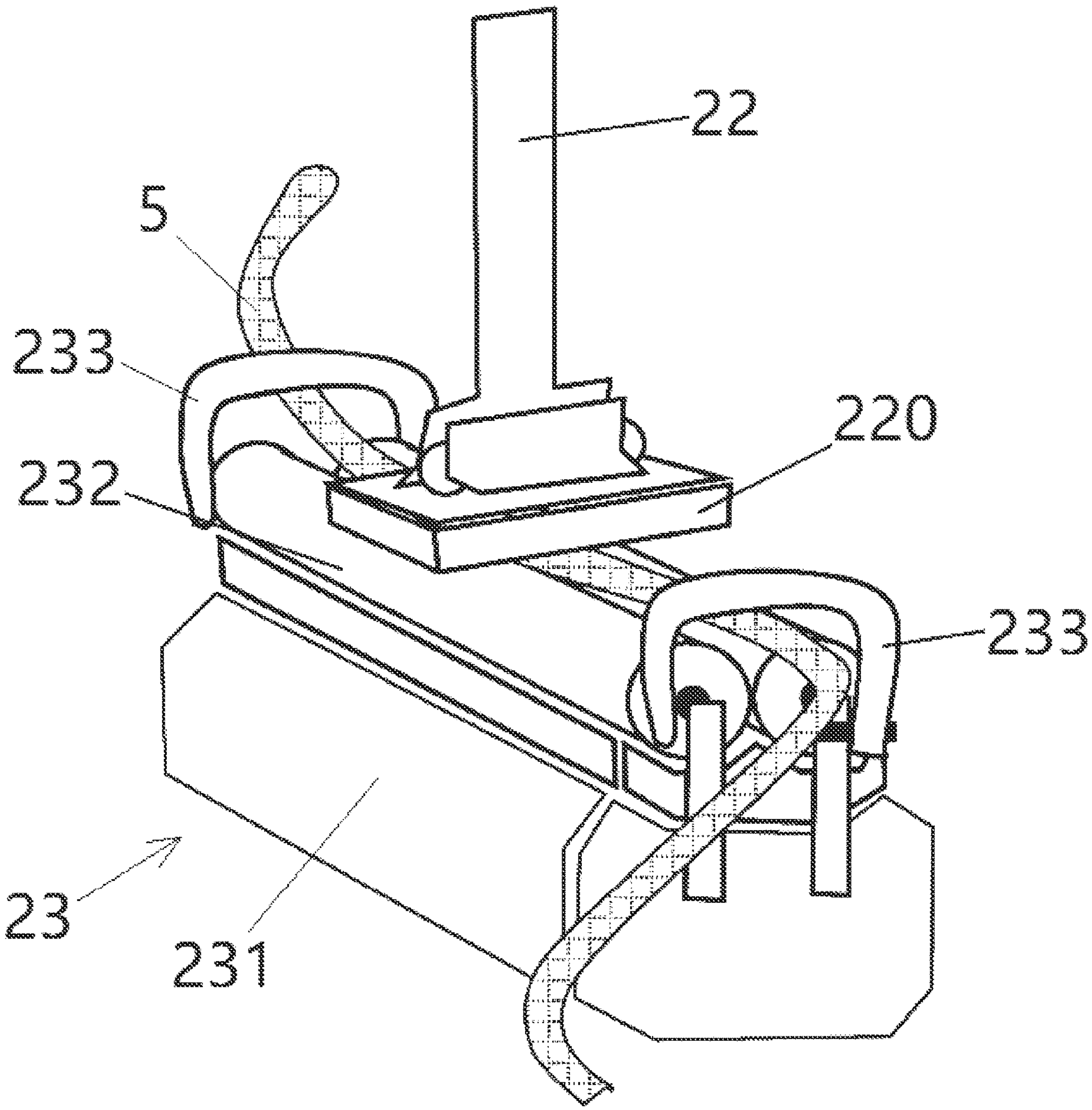
FIG. 2 illustrates a cable rotation device of a label printing and attaching system according to an exemplary embodiment of the present invention.

FIG. 1 is an illustrative view of a label printing and attaching system according to an exemplary embodiment of the present invention. FIG. 2 is an illustrative view of the cable rotation device 23 and label picker 22 of a label printing and attaching system according to an exemplary embodiment of the present invention. As shown in FIGS. 1 and 2, in an exemplary embodiment of the present invention, a label printing and attaching system is disclosed. The label printing and attaching system includes a label printing device 1 and a label attaching device 2, 21, 22. The label printing device 1 includes an ink tape supply mechanism 11, 12, a label tape supply mechanism 13, 14, 15, and a heat transfer machine 10. The ink tape supply mechanism 11, 12 is used to supply an ink tape 1*a* with a label pattern. The label tape supply mechanism 13, 14, 15 is adapted to supply a label tape 1*b*, which includes a carrier tape and a blank label paper adhered to the carrier tape. The heat transfer machine 10 is adapted to heat transfer the label pattern on the ink tape 1*a* onto the blank label paper of label tape 1*b* to obtain the desired label. The label attaching device 2, 21, 22 includes a label picker 22 and a moving device 2. The label picker 22 is adapted to pick up the label with printed label pattern from the label tape 1*b*. Moving device 2 is adapted to move the label picker 22 to attach the picked label with the printed label pattern to the product, such as a cable 5 shown in FIG. 2.

The ink tape supply mechanism 11, 12 includes an ink tape supply reel 11 and an ink tape recycling reel 12. An unused ink tape 1*a* with a label pattern are wound on the ink tape supply reel 11. The ink tape supply reel 11 is adapted to supply unused ink tape 1*a* to the heat transfer machine 10. The ink tape recycling reel 12 is adapted to coil and recycle the used ink tape 1*a* on which the label pattern has been transferred to blank label paper.

The label tape supply mechanism 13, 14, 15 includes a label tape supply reel 13 and a label tape recycling reel 14. A label tape 1*b* is wound on the label tape supply reel 13 for supplying the label tape 1*b* with blank label paper to the heat transfer machine 10. The label tape recycling reel 14 is adapted to coil and recycle the label tape 1*b* on which the label has been removed by the label picker 22. The label tape supply mechanism 13, 14, 15 also includes a label tape tension roller 15, which is arranged between the label tape supply reel 13 and the heat transfer machine 10 to tension the label tape 1*b* located between the label tape supply reel 13 and the heat transfer machine. The heat transfer machine 10 has a heat transfer channel. The ink tape 1*a* and label tape 1*b* pass through the heat transfer channel of the heat transfer machine 10 to heat transfer the label pattern on the ink tape 1*a* onto the blank label paper of the label tape 1*b*.

The label printing device 1 further includes a touch screen 16, enabling users to interact with the label printing device 1 through the touch screen 16. The label printing device 1 also includes a visual device 4, which is adapted to check or determine whether the quality of the printed label is qualified. When the quality of the printed label is qualified, the label attaching device 2 picks up the qualified label and attaches the picked up qualified label to the product. In the illustrated embodiment, the visual device 4 can be a camera.

The label printing and attaching system further includes an unqualified label recycling box (not shown), which is used to recycle the unqualified labels. When the quality of the printed label is unqualified, the label attaching device 2 picks up the unqualified label and places the picked label into the unqualified label recycling box. The label printing and attaching system also includes an installation bracket 100. The label printing device 1 is installed on the installation bracket 100.

The label printing and attaching system has a support platform 3. The installation bracket 100 and the moving device 2 are installed on the support platform 3. In the illustrated embodiment, the installation bracket 100 is detachably installed on the support platform 3, enabling the entire label printing device 1 to be quickly replaced.

The label attaching device 2 also includes a product gripper 21, which is used to grab the product and place the grabbed product in a predetermined position on the support platform 3. The label picker is used to pick up the label and attach the picked label to the product located on the support platform 3. The product gripper 21 and label picker 22 are detachably installed on the moving device 2, enabling quick replacement of the product gripper 21 and label picker 22. The moving device 2 can be a robotic hand (e.g., under computer control), a robot, or a translation mechanism.

The label printing and attaching system further includes a product fixture 31 installed on the support platform 3 for clamping and fixing the product (not shown, for example, a first product). The gripper 21 is used to grab the product and place the grabbed product onto the product fixture 31. The label picker is used to pick up the label and attach the picked label to the product fixed on the product fixture 31.

A positioning groove 32 is formed on the support platform 3, which adapted to position and fix the product (not shown, for example, a second product different from the first product). The gripper 21 is used to grab the product and place it in the positioning groove 32. The label picker 22 is used to pick up the label and attach the picked label to the product fixed in the positioning groove 32. In the illustrated embodiment, the product is a cable 5, and the label is coiled and attached to the outer surface of cable.

The label printing and attaching system includes a cable rotation device 23. The cable rotation device 23 is installed on the support platform 3 for clamping and rotating the cable 5. After the label picker 22 presses the picked up tag against the cable 5, the cable rotation device 23 drives the cable to rotate around its axis, causing the label to be coiled and attached to the outer surface of the cable. The label picker 22 includes a plate-shaped body 220, forming multiple vacuum suction holes (not shown) with array distribution on the plate-shaped body, and multiple vacuum suction holes are used for adsorbing and picking the label.

The cable rotation device 23 includes a base 231 installed on a support platform 3, a pair of cable rotating rollers 232 which can be rotatably installed on the base, and a cable retention clamp 233 for holding the cable 5 between the pair of cable rotating rollers. When the pair of cable rotating rollers 232 rotates, the pair of cable rotating rollers 232 drives the cable 5 to rotate together through frictional bonding force. This coils and adheres the label to the outer surface of cable 5. The cable rotation device 23 also includes a driver, such as a motor, which is installed on the base 231 to drive the pair of cable rotating rollers 232 to rotate. A scale 33 is also formed on the support platform 3, which adapted to measure the size of the product placed on the support platform 3. A wheel 301 and a support leg 302 are installed at the bottom of the support platform 3, enabling the support platform 3 to be moved freely by the wheel 301 or be fixedly supported at a predetermined position by the support leg 302.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A label printing and attaching system, comprising:
a label printing device, including:
an ink tape supply mechanism adapted to supply an ink tape with a label pattern;
a label tape supply mechanism adapted to supply a label tape, the label tape having a carrier tape and blank label paper adhered to the carrier tape; and
a heat transfer machine adapted to heat transfer the label pattern on the ink tape onto the blank label paper of the label tape to obtain a desired label; and
a label attaching device, including:
a label picker adapted to pick up the label with the printed label pattern from the label tape; and a moving device adapted to move the label picker to place and adhere the picked label with the printed label pattern onto a product.

2. The label printing and attaching system according to claim 1, wherein the ink tape supply mechanism includes:

an ink tape supply reel wound with an unused ink tape with the label pattern and adapted to supply unused ink tape to the heat transfer machine; and an ink tape recycling reel adapted to wind and recycle used ink tape on which the label pattern has been transferred onto the blank label paper.

3. The label printing and attaching system according to claim 2, wherein the label tape supply mechanism includes:

a label tape supply reel wound with a label tape and adapted to supply a label tape with blank label paper to the heat transfer machine; and a label tape recycling reel adapted to wind and recycle the label tape on which the label has been removed by the label picker.

4. The label printing and attaching system according to claim 3, wherein the label tape supply mechanism further includes a label tape tension roller arranged between the label tape supply reel and the heat transfer machine and adapted to tension the label tape located between the label tape supply reel and the heat transfer machine.

5. The label printing and attaching system according to claim 3, wherein the heat transfer machine has a heat transfer channel, and the ink tape and the label tape pass through the heat transfer channel of the heat transfer machine to heat transfer the label pattern on the ink tape onto the blank label paper of the label tape.

6. The label printing and attaching system according to claim 1, wherein the label printing device further includes a visual device adapted to determine whether the quality of the printed label is qualified, wherein when the quality of the printed label is qualified, the label attaching device picks up the qualified label and attaches the picked qualified label to the product.

7. The label printing and attaching system according to claim 6, further comprises an unqualified label recycling box adapted to recycle unqualified labels, wherein when the quality of the printed label is unqualified, the label attaching device picks up the unqualified label and places the picked unqualified label into the unqualified label recycling box.

8. The label printing and attaching system according to claim 1, wherein:

the label attaching device further includes a product gripper adapted to grab the product and placing the product in a predetermined position on the support platform; and the label picker is adapted to pick up the label and attach the picked label to the product located on the support platform.

9. The label printing and attaching system according to claim 8, wherein the product gripper and the label picker are detachably installed on the moving device.

10. The label printing and attaching system according to claim 9, wherein the moving device is at least one of a robotic hand, a robot, or a translation mechanism.

11. The label printing and attaching system according to claim 8, further comprises a product fixture installed on the support platform and adapted to clamp and fix the product, wherein:

the product gripper is adapted to grab the product and place the grabbed product onto the product fixture; and the label picker is adapted to pick up the label and attach the picked label to the product fixed on the product fixture.

12. The label printing and attaching system according to claim 8, wherein:

a positioning groove is formed on the support platform and adapted to position and fix the product;

the product gripper is adapted to grab the product and place the product into the positioning groove; and the label picker is adapted to pick up the label and attach the picked label to the product fixed in the positioning groove.

13. The label printing and attaching system according to claim 8, wherein the product is a cable, and the label is attached to the outer surface of the cable.

14. The label printing and attaching system according to claim 13, further comprising a cable rotation device arranged on the support platform and adapted to clamp and rotate the cable, wherein after the label picker presses the picked up label against the cable, the cable rotation device drives the cable to rotate around its axis for attaching the label to the outer surface of the cable.

15. The label printing and attaching system according to claim 14, wherein the label picker includes a plate-shaped body on which a plurality of vacuum suction holes are formed and arranged in an array, and the plurality of vacuum suction holes are adapted to pick up the label.

16. The label printing and attaching system according to claim 14, wherein the cable rotation device comprises:

a base installed on the support platform;

a pair of cable rotating rollers rotatably installed on the base; and a cable retention clamp adapted to hold the cable between the pair of cable rotating rollers, wherein when the pair of cable rotating rollers rotate, the pair of cable rotating rollers drive the cable to rotate together through frictional bonding force.

17. The label printing and attaching system according to claim 16, wherein the cable rotation device further includes a driver installed on the base to drive the pair of cable rotating rollers to rotate.

18. The label printing and attaching system according to claim 8, wherein a scale is arranged on the support platform and adapted to measure dimensions of the product placed on the support platform.

19. The label printing and attaching system according to claim 1, wherein a wheel and a support leg are installed on the bottom of the support platform and are adapted such that the support platform is moveable freely by the wheel or fixedly supported in a predetermined position by the support leg.

20. A label printing and attaching system, comprising:

a label printing device, including:

an ink tape supply mechanism adapted to supply an ink tape with a label pattern;

a label tape supply mechanism adapted to supply a label tape, the label tape having a carrier tape and blank label paper adhered to the carrier tape; and a heat transfer machine adapted to heat transfer the label pattern on the ink tape onto the blank label paper of the label tape to obtain a desired label; and a label attaching device, including:

a label picker adapted to pick up the label with the printed label pattern from the label tape; and a moving device adapted to move the label picker to place and adhere the picked label with the printed label pattern onto a product.

* * * * *